United States Patent
Troxler et al.

(10) Patent No.: US 11,799,928 B2
(45) Date of Patent: Oct. 24, 2023

(54) MOBILE DEVICE DISPLAYING REAL TIME SPORTS STATISTICS

(71) Applicants: Robert Ernest Troxler, Raleigh, NC (US); Francois J. Malassenet, Raleigh, NC (US)

(72) Inventors: Robert Ernest Troxler, Raleigh, NC (US); Francois J. Malassenet, Raleigh, NC (US)

(73) Assignee: International Research Institute (iRI) Inc., Raleigh, NC (US)

( * ) Notice: Subject to any disclaimer, the term of this patent is extended or adjusted under 35 U.S.C. 154(b) by 0 days.

(21) Appl. No.: 15/949,045

(22) Filed: Apr. 9, 2018

(65) Prior Publication Data

US 2018/0227344 A1  Aug. 9, 2018

Related U.S. Application Data (63) Continuation of application No. 14/217,305, filed on Mar. 17, 2014, now abandoned.

(60) Provisional application No. 61/791,116, filed on Mar. 15, 2013.

(51) Int. Cl.
| | |
|---|---|
| *H04L 65/60* | (2022.01) |
| *H04L 65/70* | (2022.01) |
| *H04L 65/75* | (2022.01) |
| *H04L 67/561* | (2022.01) |

(52) U.S. Cl.
CPC .............. *H04L 65/60* (2013.01); *H04L 65/70* (2022.05); *H04L 65/764* (2022.05); *H04L 67/561* (2022.05)

(58) Field of Classification Search
CPC ..... H04L 65/60; H04L 65/607; H04L 65/604; H04L 67/2804
See application file for complete search history.

(56) References Cited

U.S. PATENT DOCUMENTS

| | | | | |
|---|---|---|---|---|
| 2003/0229900 | A1* | 12/2003 | Reisman | H04N 21/4755 348/E7.071 |
| 2009/0015716 | A1* | 1/2009 | Doedens | H04N 5/45 348/E5.099 |
| 2012/0238254 | A1* | 9/2012 | Yankovich | H04N 21/47815 455/414.2 |
| 2012/0278428 | A1* | 11/2012 | Harrison | H04N 21/2665 709/217 |
| 2013/0219425 | A1* | 8/2013 | Swartz | H04N 21/812 725/32 |
| 2013/0278828 | A1* | 10/2013 | Todd | H04N 21/4753 348/E5.099 |
| 2014/0032639 | A1* | 1/2014 | Trousdell | A63F 13/79 709/203 |
| 2014/0195675 | A1* | 7/2014 | Silver | H04L 65/611 709/224 |

* cited by examiner

*Primary Examiner* — Suraj M Joshi
*Assistant Examiner* — Jaren Means
(74) *Attorney, Agent, or Firm* — NK Patent Law (57) ABSTRACT

A portable electronic device includes a memory and a processor. The processor is configured to display real time sports statistics received from an external entity. Authentication of the electronic device occurs with the external entity.

12 Claims, 7 Drawing Sheets

MOBILE DEVICE DISPLAYING REAL TIME SPORTS STATISTICS

CROSS REFERENCE TO RELATED APPLICATION

This application claims the benefit of U.S. Utility application Ser. No. 14/217,305 filed Mar. 17, 2014, which claims priority to U.S. Provisional Patent Application No. 61/791,116, filed Mar. 15, 2013 and titled NOVEL DEVICES, SYSTEMS, AND METHODS; the content of which are hereby incorporated herein by reference in its entirety.

1. TECHNICAL FIELD

The present disclosure relates to presentation of multimedia content, and more specifically, to systems and methods for identifying and separately presenting different portions of streaming multimedia content.

2. DESCRIPTION OF RELATED ART

With the development of real-time digital video processing and real-time digital data mining and processing, television broadcasters and media streaming operators are now able to insert targeted and live digital on-screen graphics (DOG) into their video streams. These additional watermark-like overlays include information regarding sports events scores, weather forecasts, weather alerts, stock price ticker, news headlines, amber alerts, school or public facility closings, election results, future show information, and the content origin such as the logo of the broadcasting television (TV) station or Internet video streaming service. Translucent or opaque, these overlays occlude a significant portion of the viewing area. For example, during live or fast moving scenes, such as local news or live sports events, zones of essential interest may be completely hidden. When compounded with the annoyance of moving DOGs that are highlighted with loud additional music or noise also known as digital on-screen multimedia (DOM), the resulting level of frustration leads the viewer to often switch to a different channel.

In other cases, the DOM is a permanent "crawler" which is less distracting as it located at a fixed location and only scrolls information. In over-the-air television (OTA-TV), cable television (CA-TV), and satellite television (S-TV) broadcast, these crawlers are generated and packaged into the actual video stream. They thus cover a very broad range of content in order to provide information to all viewers. For example, sports channels crawlers report final or partial scores for all teams and all sports of a given day. The viewer must, thus, wait a distracting amount of time before his or her teams of interest appear.

In view of the foregoing, it is desired to provide systems and methods for managing DOGs and DOMs that distract from displayed video streams. It is further desired to provide systems that enhance viewing experience by additional displays of relevant information and audio enhancements.

BRIEF SUMMARY

Disclosed herein are systems and methods for identifying and separately presenting different portions of streaming multimedia content. According to an aspect, a system includes a multimedia content processor. The multimedia content processor may be configured to receive streaming multimedia content comprising first and second portions for simultaneous streaming presentation. Further, the multimedia content processor may be configured to identify the first and second portions of the multimedia content. The system may include a first output component configured to output the first portion of the multimedia content. Further, the system may include a second output component configured to output the second portion of the multimedia content.

According to an aspect, multimedia content may be received from multiple different multimedia sources. In one case, multimedia content from one source may be communicated to and presented at one user interface, while multimedia content from another source may be communicated to and presented at another user interface. The different multimedia contents may be presented at random times, periodically, continuously, when polled, when updated, or in real time. In an example, a sporting event may be watched on a primary television functioning as a recipient of a first output component, while simultaneously is displayed an enhanced scoreboard from a content provider on another user interface functioning as a recipient of a second output component. In another example, overlay content may be removed from a broadcast signal, the video in the signal displayed on a first user interface (e.g., television), while displaying scores or other content on an enhanced scoreboard. In another example, a broadcast signal with video may remove the overlay or translucent display from the video, display this output, and subsequently the removed overlay may be displayed on another display.

According to another aspect the system may include a multimedia content processor; the multimedia content processor may be configured to receive streaming multimedia content comprising first and second portions for simultaneous streaming presentation. Further content from a separate multimedia source may provide a third portion of content. The system may include a first output component configured to output the first portion of the multimedia content. Further, the system may include a second output component configured to output the third portion of the multimedia content.

The presently disclosed subject matter can, for example, enhance the television viewer experience and solve the aforementioned problems by automatically removing digital on-screen multimedia generated by content providers and by communicating the removed content and additional personalized information onto a separate display. The removal of the DOM can be performed by automatic recognition of the DOM and further enhancing the media by cropping-resizing of the video or inpainting the region that is occluded by the DOM.

DETAILED DESCRIPTION

The presently disclosed subject matter has been made to enhance the television viewer experience and solve the problem by automatically removing digital on-screen multimedia generated by content providers and by communicating the removed content and additional personalized information onto a separate display. The removal of the DOM can be performed by automatic recognition of the DOM and enhancing the displayed video by cropping-resizing of the video or inpainting the region that is occluded by the DOM. In some cases, the DOM contains an original content and additional overlay content or instructions to display the overlay. Removing said overlay content or instruction eliminates any need to inpaint or crop-resize. In some cases, it may be desirable to remove the DOM and not post separately on a display.

As referred to herein, the term "multimedia content" may include any type of content that may be presented to a user. For example, multimedia content may include, but is not limited to, video and audio content, still images, midi format, metadata, database queries, digital watermarks, signals from measurement equipment, and the like. The video and/or audio content may be streamed content from a multimedia source, such as over the air television, cable television, satellite, the Internet, an electronic device, or broadcast television. The multimedia content may be presented on any suitable device, such as an electronic device or a television.

As referred to herein, the term "electronic device" may be any device capable of receiving multimedia content and presenting the multimedia content. For example, the electronic device may be a computer, a monitor, a display (e.g., a television), a smartphone, an electronic tablet, smart watch, smart glasses, heads up display, or the like. The electronic device may include a user interface such as a display screen and suitable electronics for displaying video content. The electronic device may include one or more speakers for presenting audio content. The electronic device may be also capable to present three-dimensional video content. Another example electronic device is a set-top box (STB) or set-top unit (STU) that is an information appliance device that can include a TV-tuner input and display output that connects to a television. The STB can also connect to an external source (e.g., a suitable multimedia source), and tune the source signal into content in a form that can be displayed on a television display screen or other electronic device having a display.

Figure 1:
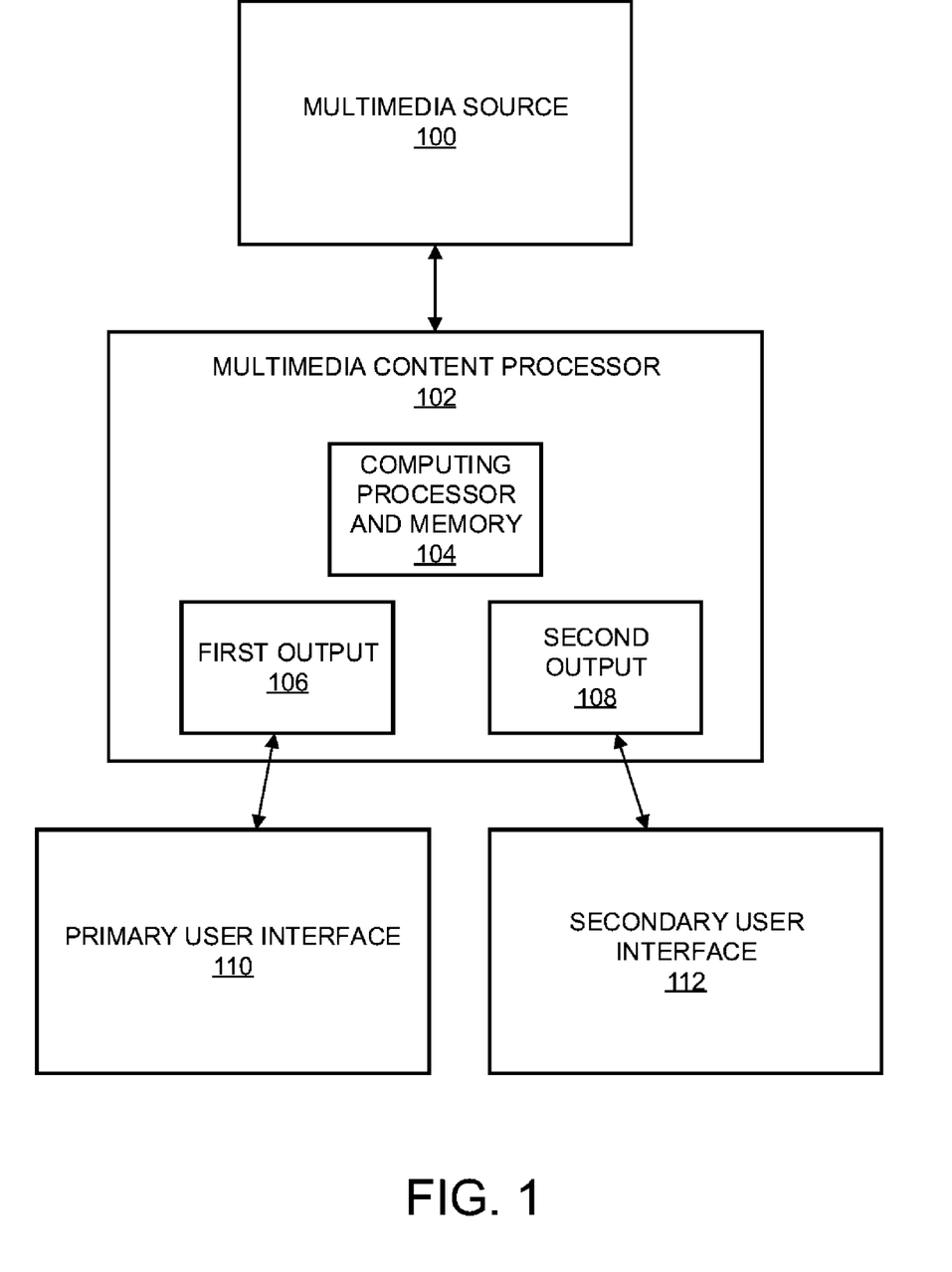
FIG. 1 is a block diagram of an example system for identifying and separately presenting different portions of streaming multimedia content in accordance with embodiments of the present disclosure.

FIG. 1 is a block diagram of an example system for identifying and separately presenting different portions of streaming multimedia content in accordance with embodiments of the present disclosure. Referring to FIG. 1, the system may include one or more multimedia sources, such as multimedia source 100. Example multimedia sources include, but are not limited to, antenna TV, cable television, satellite, an electronic device, or broadcast television (e.g., high definition (HD) television broadcast). In other examples, multimedia sources include computing devices such as smartphone, laptop computer, desktop computers, tablets, digital recording devices, video cameras, and the like. The multimedia source 100 may generate, route, and/or store multimedia content such as video content and/or audio content. Further, the multimedia source 100 may include suitable hardware, software, firmware, or combinations thereof for generating, routing, and/or storing the multimedia content. The multimedia source 100 may communicate the multimedia content to one or more electronic devices such as a set-top box, a computing device (e.g., laptop computer, tablet computer, etc.), and the like for presenting to a user via a user interface. Although only one multimedia source is shown in this example, it should be understood that the multimedia content processor 102 may receive multimedia content from one or more other multimedia sources.

The system of FIG. 1 includes a multimedia content processor 102 that may reside in an electronic device configured to receive multimedia content from the multimedia source 100. For example, the multimedia source 100 may stream multimedia content (e.g., video and/or audio) to the electronic device having the multimedia content processor 102. For example, the multimedia content may be streamed via a wireless broadcast signal, the Internet, a suitable network, cable connection, or the like. The multimedia content processor 102 and/or the electronic device within which the processor 102 resides may include memory configured to store and buffer the multimedia content. For example, the multimedia content processor 102 includes a computing processor and memory 104 for managing multimedia content and for routing portions of the multimedia content to other electronics devices in accordance with embodiments of the present disclosure. Alternative to a computing processor and memory, the functionality of the processor 104 may be suitably implemented by any other suitable hardware, software, firmware, or combinations thereof. Multimedia processor may reside in the primary or secondary user interface, plug-in to the primary or secondary interface, or reside in a separate table top box. Multiprocessor can be mobile so as switching locations such as from home to a local gathering place is seamless.

The streamed multimedia content may include different portions for simultaneous streaming presentation to a user. For example, the multimedia content streamed to the multimedia content processor 102 may include different portions of video content. One portion of the video content may include information or data for full-screen display of video content. In other words, an electronic device with a display can use the information or data for displaying this portion of video content on a full display space of the display. In a television having 1024×768 pixel resolution for example, this means that the television can use the information for this video content portion for entirely displaying streaming video on the display screen of the television.

Further, the streamed multimedia content may include another portion that includes information or data for partial-screen display of video content over the video content that is for full-screen display. As an example, this other portion of content for partial-screen display may be a digital on-screen graphic or digital on-screen multimedia for overlaying the content for full-screen display. Example digital on-screen graphics and digital on-screen multimedia include, but are not limited to, weather information, breaking news information, network provider logo, stock information, sports scores, school and business closings or delays, alerts, and the like.

Figure 2:
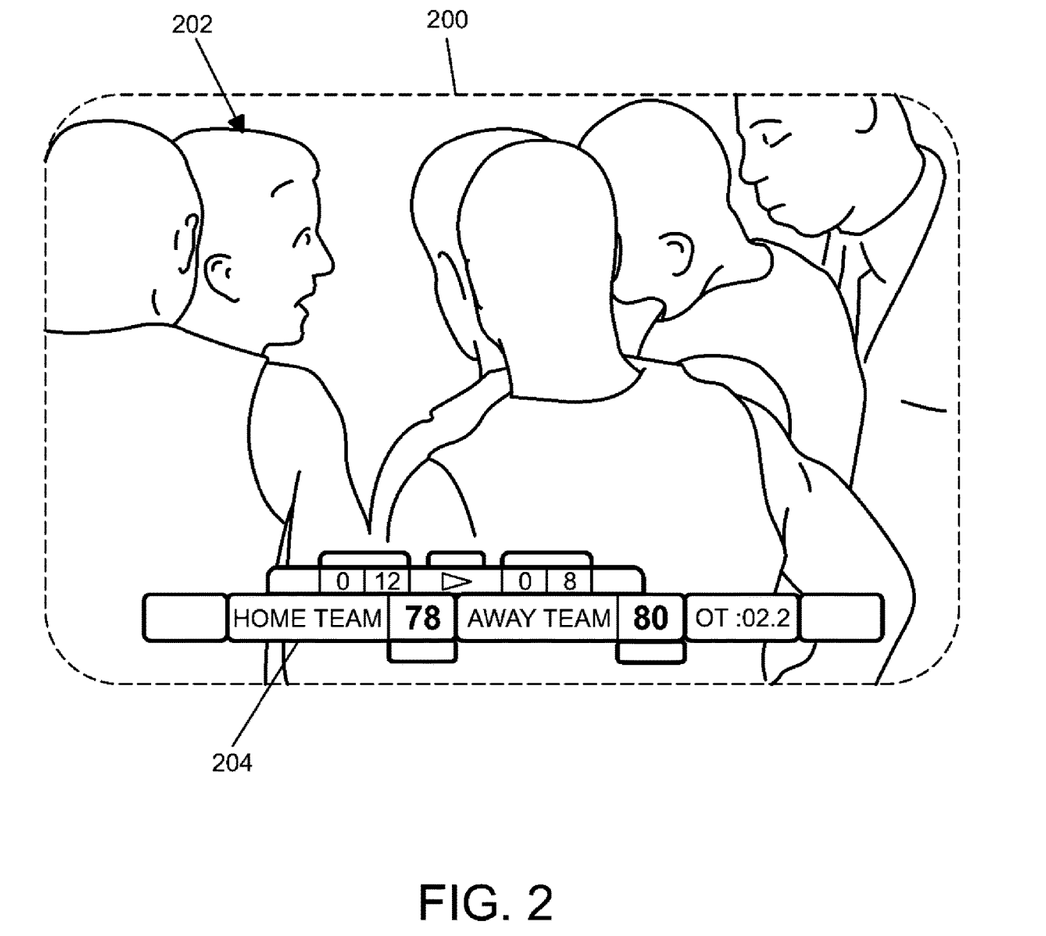
FIG. 2 is an image of an example display screen controlled to display a full-screen display portion of video content and a digital on-screen multimedia.

FIG. 2 illustrates an image of an example display screen 200 controlled to display a full-screen digital display portion of video content, generally designated 202, and a digital on-screen multimedia, generally designated 204. The multimedia content streamed from the multimedia source 100 shown in FIG. 1 may include information or data for displaying the video content 202 with overlaid digital on-screen multimedia 204 shown in FIG. 2. In this example, the video content 202 is part of video coverage of a sporting event with a score and other information related to the sporting event being provided within the digital on-screen multimedia 204. In the alternative, the video content 202 may include any other type of video and the digital on-screen multimedia 204 may be any suitable information or graphics that has overlaid the video content 202. In accordance with embodiments of the present disclosure and as will be described in more detail herein, disclosed systems and methods may identify these portions in received video content and separate the identified portions for output to separate electronic devices (e.g., a television and a secondary display device) for separate display on the electronic devices. In this way, a user may watch the full-screen display of the video content 202 without overlay on a primary electronic device (e.g., television) while the other video content 204 is displayed on the display of the other electronic device (e.g., a tablet computer, or a monitor appearing substantially like an actual game board mounted above the television).

Referring again now to FIG. 1, the multimedia content processor 102 may be configured to identify the first and second portions of the multimedia content. Further, the multimedia content processor 102 may output the identified first and second portions via first and second output components 106 and 108, respectively. The multimedia content processor 102 may distinguish the first video portion from the second video portion. The first and second output components 106 and 108 may be communicatively connected to a primary user interface 110 and a secondary user interface 112, respectively, for communication. By these connections, the first output component 106 may output the first video portion to the primary user interface 110, and the second output component 108 may output the second video portion to the secondary user interface 112. In this way, the primary user interface 110 and the secondary user interface 112 may separately display the first and second video portions. The portions of multimedia content presented on the user interfaces 110 and 112 may be presented in real time, continuously, randomly, periodically, as updated and the like.

Figure 3A:
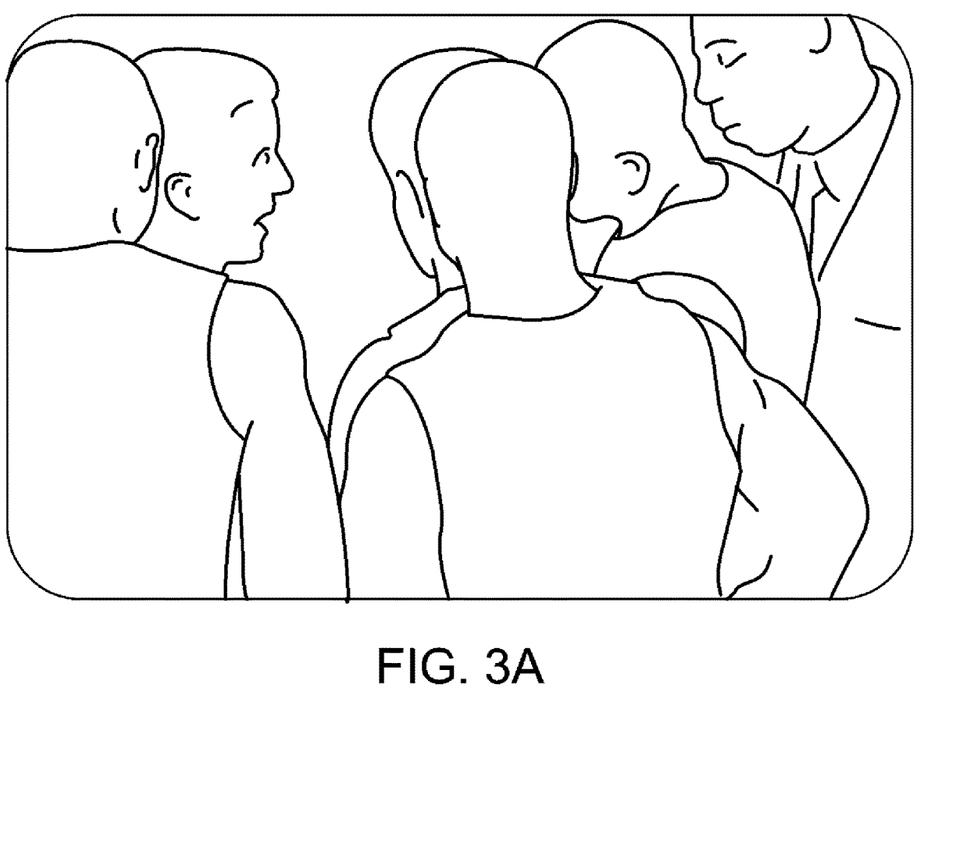
FIGS. 3A and 3B illustrate images of example display screens that are controlled to separately display the full-screen display portion and the digital on-screen multimedia shown in FIG. 2 in accordance with embodiments of the present disclosure.
Figure 3B:
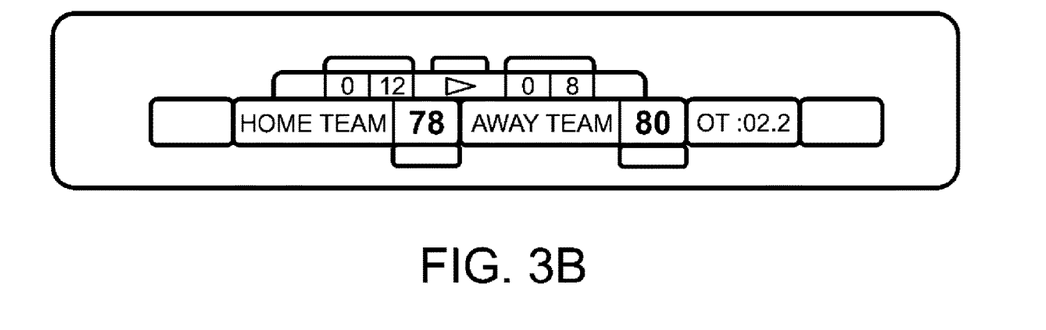

FIGS. 3A and 3B illustrate images of example display screens that are controlled to separately display the full-screen display portion and the digital on-screen multimedia shown in FIG. 2 in accordance with embodiments of the present disclosure. As shown in FIGS. 3A and 3B, the full-screen display portion is displayed without having the digital on-screen multimedia portion overlaying it to encumber the user's viewing. The display shown in FIG. 3A may be displayed on a display screen of the primary user interface 110, such as a large screen television, in a full-screen mode. The display shown in FIG. 3B may be displayed on a display screen of the secondary user interface 112, such as a separate display that is smaller than the large screen television. Alternatively, a different more sophisticated display data stream from a second media source can be displayed on the secondary display. The display screen of FIG. 3A would not display an image with a missing section of course; rather it would show the real time continuous data that lay beneath the overlay.

Figure 4:
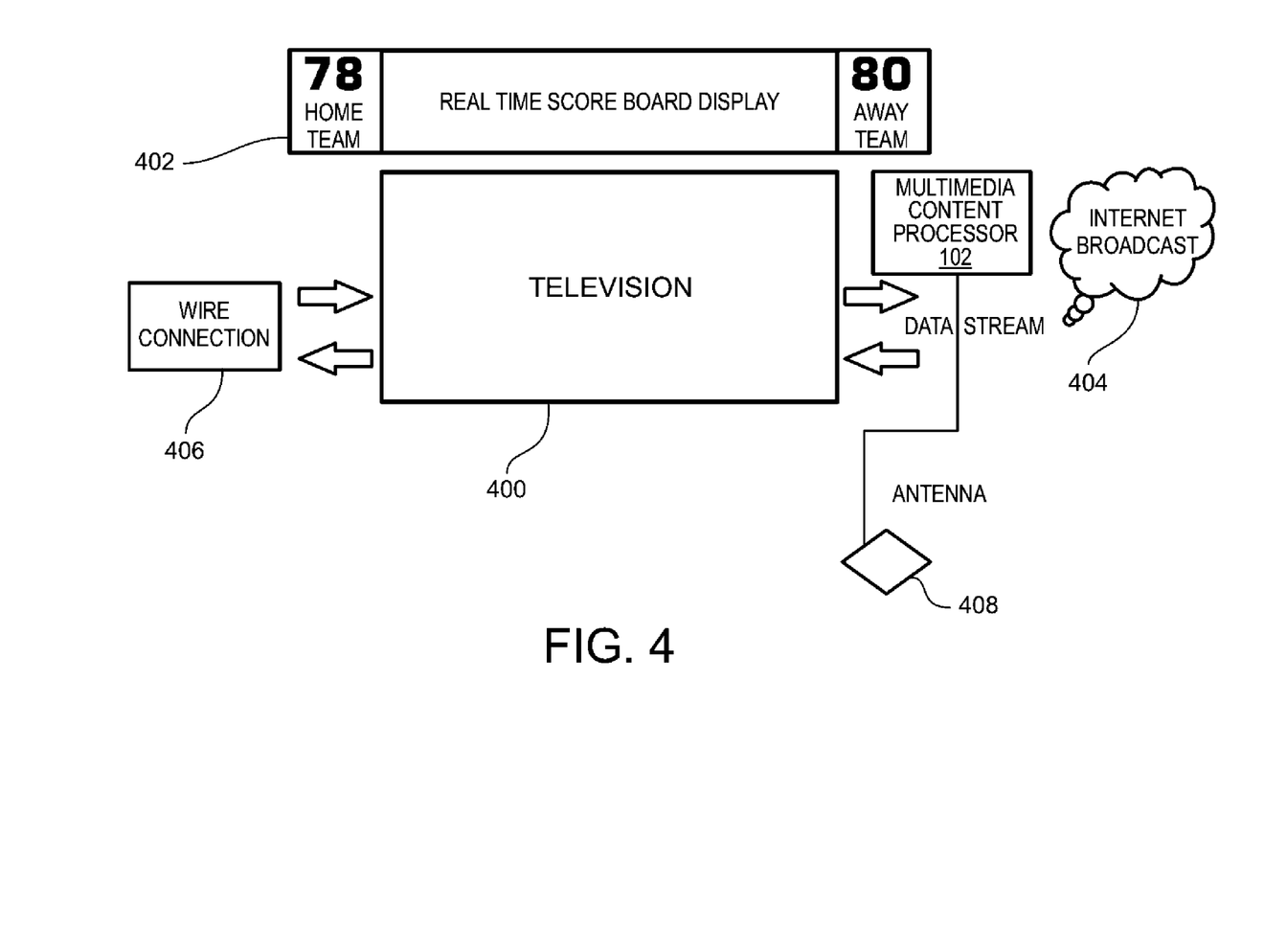
FIG. 4 illustrates a schematic view of an example environment for presenting different portions of multimedia content on different user interfaces in accordance with embodiments of the present disclosure.

FIG. 4 illustrates a schematic view of an example environment for presenting different portions of multimedia content on different user interfaces in accordance with embodiments of the present disclosure. Referring to FIG. 4, a television 400 may be one of the user interfaces that can receive input for displaying a full-screen display portion of multimedia content received at the multimedia content processor 102. A television appendage component 402 may be the other user interface that can receive input for displaying digital on-screen multimedia received at the multimedia content processor 102. The full-screen display portion and the digital on-screen multimedia may be streamed to the processor 102 via Internet broadcast 404 or any other suitable communication technique. In another example, the multimedia content may be received from a wire connection 406 that can receive video feeds to the processor 102. In other embodiments, the multimedia content may be received from a terrestrial television broadcast via an antenna 408.

In the example of FIG. 4, the broadcasted video is a basketball game where the broadcaster has overlaid the game score and statistics information. In the shown configuration, the television appendage component 402 is located in close proximity, but can be mechanically integrated with a display. The television appendage component 402 may receive video stream from the processor 102. The processor 102 may receive video frames and parse out the score and statistics information via optical character recognition (OCR). However, when the broadcast is transmitted using Internet Protocol Television (IPTV), the score and statistics information can be included in the metadata fields of the packetized compressed video stream. In this case, the processor 102 can recover the information directly from packets and thus spare the resources needed perform the OCR. The metadata fields may be encrypted or may be protected by digital rights management. In this case, their decryption and access may be subject to the permissions or validation keys. In an example, the television appendage 402 may be a scoreboard manufactured by Daktronics that is configured to use a combination of static lettering and a multiplicity of light emitting diode (LED) numeric displays for displaying a score and other live sporting event information. These boards are intended for use in the gymnasium. Many different types of displays may be integrated or connected to the television appendage 402, they include LED, organic LEDs (OLED), egg crate, plasma, or vacuum fluorescent displays, and the like. At any rate, the preferred method is to remove packets whereby the permissions and decryption keys are provided, and redisplaying is accomplished by the media processor.

In embodiments, the television appendage 402 may include a channel selector configured to extract score and statistics information from one selected channel while the television 400 is tuned to a different channel. Alternatively, the processor 102 may implement the channel selector and communicate the selected channel score and statistics information to the television appendage 402.

In an example, the television appendage 402 may be integrated into a single package with the processor 102. The television appendage 402 and processor 102 in this configuration may be suitable for positioning above the television 400. A user or viewer may be authenticated by the television appendage 402. The authentication may be performed via one of the following methods, a password challenge from a cellular phone, the universal unique identifier (UUID) of cellular phone, a location awareness, WI-FI®, BLUETOOTH®, BLUETOOTH® low energy (BLE), near field communication (NFC) communication modems, or a radio-frequency identification (RFID) such as a fob 28 or an RFID chip 30 whose identification is communicated through a reader 29. The identification can also be performed via password challenge using the TV screen as display and remote control, or using a cell phone, and tablet as virtual keyboard for example. Other techniques for strong or weak authentication as will be understood can be part of the functionality of the television appendage 402 and/or the processor 102. For example, biometric authentication may be utilized. The identity management (IdM) can be performed directly by the television appendage 402 and/or the processor 102 or can be outsourced to a separate remote or local server. Example protocols used for IdM can be any of the standards used in the field such as, but not limited to, OpenID, WS-Trust, SAML 2.0, OAuth, or the like. Once the user is authenticated, the television appendage 402 and/or the processor 102 may retrieve the personalized configuration from an authenticated secure database. This database can be stored locally or remotely. Due to the sensitivity of the viewer profile information, this database may be encrypted. Further, the query requests and results may also be encrypted. The personalized configuration may also include digital rights granted to the user in order to decrypt multimedia content.

This personalized configuration may establish the type of information to retrieve and the timing of each retrieval. It may also specify the format and timing of the display of the information. An example of configuration is to query a particular basketball team's scores once a day, or every second during a live game, weather conditions, and a daily report of player information (e.g., fantasy sports league information for a player). The scores may be displayed with the home team shown in second place for certain sports and first place for other sports. In the shown configuration, the television appendage 402 and/or the processor 102 may be connected to the Internet 404 via a wireless or wired connection. Based on the type of information to be retrieved, the television appendage 402 and/or the processor 102 may query different database services, servers, or bulletin boards. Examples of servers are sports scores servers, election results servers, emergency information such as weather information or alerts, amber alerts, public service information such as road closings, traffic, weather related school closings, and pollution event bulletin boards. For services that require password access, the television appendage communication system may be configured to use a disposable ephemeral valet key such as established by the OAuth 2.0 protocol. This secure mechanism can enable the television appendage to query personal accounts on third party servers without using the true passwords. Personal scores from fantasy sport teams can be accessed by the television appendage without putting their owners credentials in danger of being stolen. In the described configuration, the television appendage may function independently from the television 400. However, the television 400 or a smart phone can be used further to display the personalized configuration and provide functionality to update it.

In embodiments, the television appendage 402 and/or processor 102 may be integrated into any suitable computing device such as, but not limited to, a laptop computer, a personal computer, a video gaming console (e.g., Microsoft Xbox, Sony Play Station), a smart phone, video streaming devices (e.g., Chromecast, Roku, Apple TV), or the like may be used to control the television, the television appendage, or combination thereof. Either the appendage or the multimedia processor can be portable devices; the processor 102 can act as a plug-in on a host device such as the primary or secondary interface ports.

In embodiments, the television appendage 402 and/or processor 102 may include an audio sound system. The sound system may be configured to transmit sounds from extracted DOMs, sounds based on the type of data being displayed, absolute timing such as time of day, time intervals, or some other configuration set up. The configuration can be personalized by the viewer (e.g., generate a synthetic voice summary of the reported data base on time), or triggered event such as scoring event, winning the game, and the like. As a sports scoreboard, the audio may signify a "buzzer" when a player is substituted, or the audio may be a continuous signal replicating the stadium cheering and sounds. This could be real time audio stream from the stadium giving the viewer a different dimension to sports viewing from home or in a different location such as a bar. Conversely, it may be previously recorded or synthetic audio similar to the "canned laughter" which we all hate and despise or musical or other introductions. Other examples of audio content include alerts and weather warnings.

Figure 5:
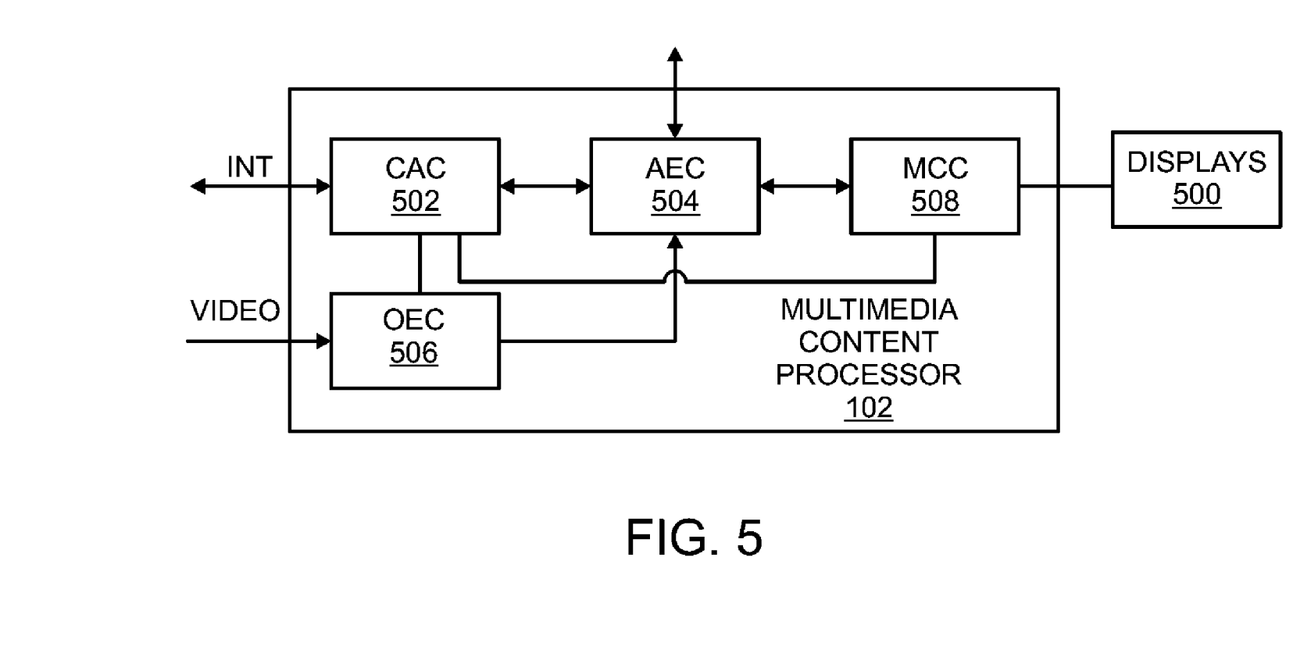
FIG. 5 illustrates a block diagram of an example multimedia content processor and displays in accordance with embodiments of the present disclosure.

FIG. 5 illustrates a block diagram of an example multimedia content processor 102 and displays 500 in accordance with embodiments of the present disclosure. The components shown in FIG. 5 may be logical or software units. Referring to FIG. 5, the multimedia content processor 102 includes a configuration and authentication component (CAC) module 502, an aggregation extraction component (AEC) 504, an overlay extraction component (OEC) 506, and a metadata communicator component (MCC) 508. Functionality includes managing the configuration regarding the type of information to extract and display. Some of features include, but are not limited to, the retrieval, storage configuration settings, and transfer of configuration settings to other components of the processor 102. It may also authenticate the user and provides a secure and encrypted transfer of said configuration settings. Finally, it may handle digital rights management (DRM).

The retrieval and storage of the configuration setting can be internal or external to the processor 102. The CAC 502 may be configured to retrieve interrupt signals that temporarily override the configuration setting via a communication link. Upon reception, the CAC 502 may authenticate the interrupt request and forward the update configuration settings to the other components. An example of interrupt is a request to update a game that a viewer may want to be displayed and that is not part of the regular configuration settings, i.e., display a live basketball game score.

The AEC 504 may communicate with the CAC 502 to acquire pertinent configuration settings. The AEC 504 may convert the configuration settings into instructions to query internal or external servers for expected information. The AEC 504 may retrieve a default configuration and cache some of the queries to improve performance of the overall system. Examples of default configuration include, but are not limited to, uniform resource locator (URL) or the Internet protocol (IP) address of a specific source of weather information, or traffic information server. The AEC 504 can be configured to manage American Standard Code for Information Interchange (ASCII) format or binary data transmission such as Extensible Markup Language (XML), JavaScript Object Notation (JSON), Structured Query Language (SQL), extended character based formats such as Unicode, binary JSON (BSON) or other ad-hoc formats that enable secure and encrypted information. The communication with servers can be performed via packets such for (IP protocol), dedicated links such as in digital subscriber line (DSL), or physical layer communication such as optical fiber links. The selection of the mode can be determined based on the configuration information retrieved from the CAC 502. The CAC 502 may capture the metadata extracted from the OEC 506 via a communication link. The OEC 506 is not required for CAC operations. The AEC 504 extracts the information retrieved from both to links based on the configuration settings. For example, if the OEC 506 may provide information about scores that are more up-to-date than the ones retrieved from databases, the CAC 502 may ignore outdated information. The algorithms to determine the information consistencies may be based on time stamps, decrease of score values, increase of points for fantasy football and the like. The AEC 504 is configurable to update such algorithms. Once the information is verified, it converts it into a format that the MCC 508 can understand and transmits it to the MCC using the link. The AEC 504 can apply its own digital rights management in order to validate configuration settings. For example, premium users may be allowed real-time or interrupt based message while guest users may only be allowed to display scores every 10 seconds. Not only can premium be defined as a faster service or feature, but premium may block any advertising media providers may deploy to either interface.

The MCC 508 may buffer data received from the AEC 504. The data is prioritized and scheduled according to the current validated configuration settings received from the CAC 502 via the communication link. For example, the MCC 508 can be configured to display given team scores at intervals ranging from 10 seconds to 20 seconds, but other teams only when the score changes. When the interrupt request is processed by the CAC 502, the configuration settings are updated to include the game with intervals between 5 and 10 seconds. The AEC 504 prioritizes, sorts the information, and flags new data with the "new data flag." The data is packaged to include the new data flag and potentially some viewer identification such as personal identifying nicknames and the like. It is then scheduled and buffered prior to sending. The newly packaged information data is then forwarded to the at least one of the displays 500. The corresponding output schedule and data format take also into account the throughput, graphics resolution, time-delays of the display, etc. Prior to operating the processor 102, an initialization phase configures the number of displays, the technical characteristics, and expected data format for each display. This initialization phase may be also performed during a "hot swapping" phase when a display may be added, removed, or updated while the data is being streamed. For example, wireless displays can be connected and disconnected seamlessly. In case of software product embodiments, users can create new software display windows without stopping operations nor initialization of the software product. The addition and removal of a display may be subject to a dedicated authentication and authorization protocol. It may also be subject to prior grant access.

The processor 102 may parse the stream and extract the information to be displayed and outputs into the communication link. On the other hand, the OEC 506 removes the overlays from the video stream and outputs the uncluttered video stream to the communication link. During the parsing process, the OEC 506 scans the metadata attached to the video stream if such metadata exists such as in video generated by IPTV or other Internet Streaming services such as YouTube™, Hulu™, NetFlix™ that use MPEG4, Flash Video (FLV), H.264, etc. When the video stream is encrypted or is protected with DRM, the authentication and decryption keys are supplied by the CAC 502 via the communication link. The OEC 502 extracts the metadata that is pertinent to the configuration settings and transmits it to the AEC 504 via the communication link. If the video stream contains no metadata relevant to information to be displayed, the OEC 506 can be configured to perform OCR, or voice recognition (VR) to extract information content. When OCR must be performed, the OEC 506 can be further configured to parse selected regions of interest, e.g., lower third of the screen to reduce computing complexity and electric power requirements. The extracted information content is forwarded the AEC 504 via the communication link. The OCR is also subject to digital rights management provided by the AEC 504.

The OEC also can be configured to remove overlays that occlude the video viewing area. When the video stream is fully digital, overlays can be generated on the fly during decoding at the display according to instructions contained into metadata fields. If the corresponding metadata fields are present in the video stream 407, the OEC 506 removes or deactivates these overlay metadata fields based on the configuration settings provided by the CAC 502. This removal can be subject to digital rights management provided by AEC 504. For example, ESPN may not provide such a feature to non-premium customers. When the overlays are part of the video stream itself, the OEC 506 can remove them from the stream. An embodiment of this technique is to crop each frame and rescale the video to fill the entire frame. This method is suitable for crawlers along screen edges. Another embodiment is to identify the zones where the at least one overlay exist and inpaint them. An example of inpainting method is described in *Video Inpainting Under Constrained Camera Motion*, K. A. Patwardhan, et al., IEEE Trans on Image Processing, Vol. 16, No 2, pp. 545-553, 2007, the disclosure of which is incorporated by reference in its entirety.

The identification of overlay location can be achieved based on a priori information regarding the broadcast, on information generated by the OCR, or on advanced video pattern recognition that can leverage cues such as loud sounds in the case of commercial messages. All currently available digital video encoders are block-based and the zones typically of hundreds of such blocks. Thus, the location identification may be efficiently implemented without requiring block decoding. It can be implemented as a direct search on encoded blocks. For zones that are occluded by an opaque overlay, diffusion-based, exemplar-based, or sparse-based methods may be used. For zones that are occluded via a translucent overlay, simpler techniques such as histogram enhancement can be used. If the crop-and-resize approach is chosen, the algorithm is self-explanatory. Overlaid regions are removed resulting in a smaller video frame size. The OEC 506 can be configured to require that the output video stream has the same frame size as the input; in this case, each frame is resized and interpolated to recover the original signal size. Otherwise, the OEC 506 can forward the smaller size video stream. Both inpainting and crop-and-resize methods are not exclusive as inpainting may be required in the retained zone that is not cropped. Not only can overlays be removed and inpainting performed, but blocks of multiple layers or all layers can be removed or silenced and a message or substituted media be displayed. Such events may be of interest for removing commercial or rather advertisement media and then restarting the regular content display when it reappears.

Figure 6:
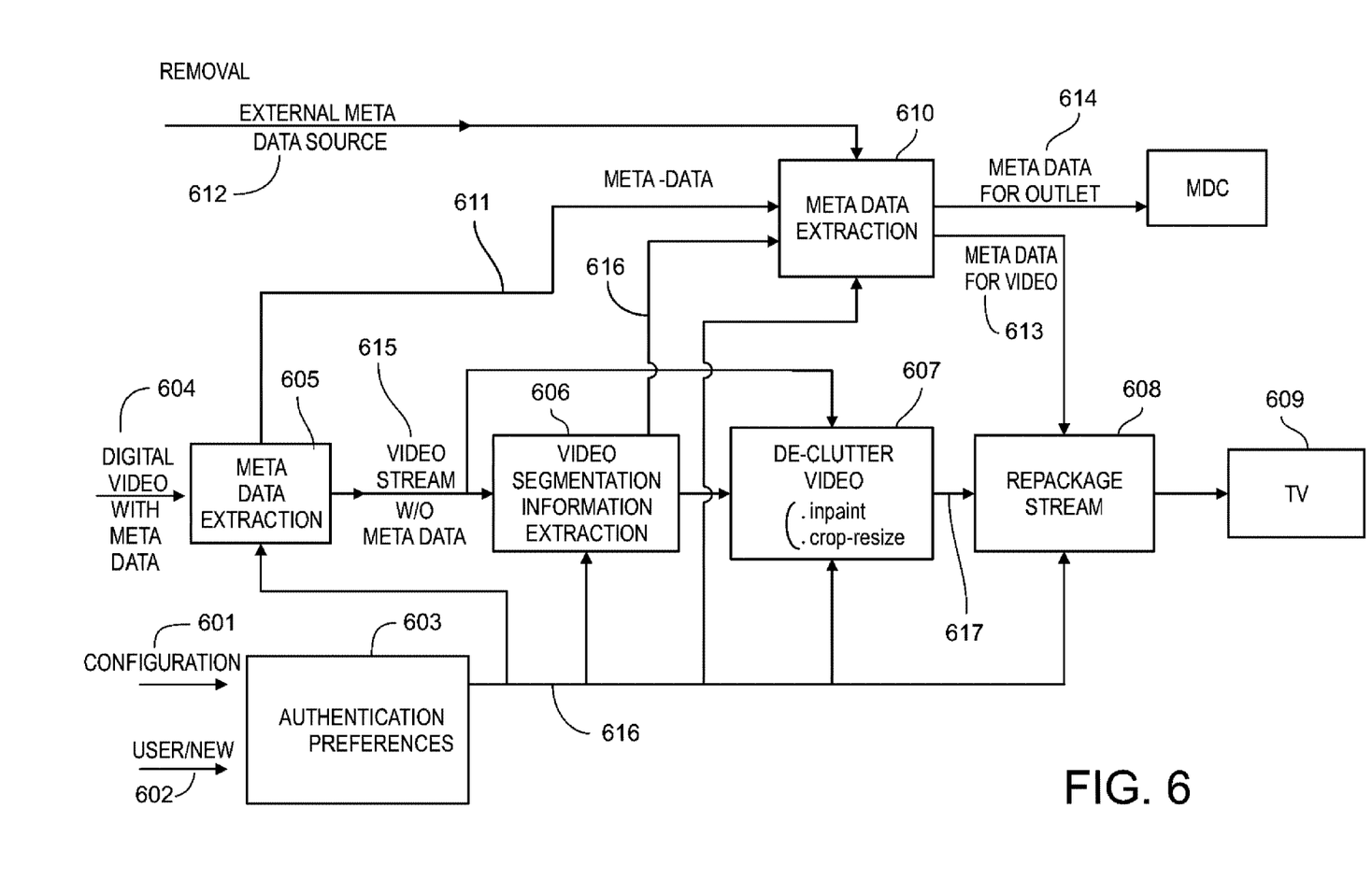
FIG. 6 illustrates a block diagram of an example logic flow for digital on-screen graphic removal in accordance with embodiments of the present disclosure.

FIG. 6 illustrates a block diagram of an example logic flow for digital on-screen graphic removal in accordance with embodiments of the present disclosure. Referring to FIG. 6, configuration settings 601 and user information 602 are retrieved and processed by an authentication program 603 to generate validated configuration settings 616. The validation process takes into account digital rights. At least one multimedia stream 604 is processed by the metadata extraction program 605 based on the validated configuration settings 616 extracts metadata 611 to be displayed herein and generate a multimedia data stream 615 where the extracted metadata is either removed, stripped or kept intact based on the configuration setting 616. The multimedia stream 615 is then processed by the video segmentation and information extraction program 606 to extract metadata information from zones of interests based on the configuration settings 616. For example, score information is extracted from the lower third of the each video intra-frame, voice is recognized to determine the call of a football referee. The multimedia data stream is further processed by the declutter program 607, based on configuration settings 616. The declutter program 607 crops-and-resizes or inpaints fully or partially occluded regions to generate a decluttered multimedia stream 617. In parallel, the meta data extraction program 610, retrieves external data 612 from the Internet or other servers, combines it with the other meta data streams 611 and 616, packages them to be further processed by the MCC 508, and forwards some metadata 613 to the repackage stream process 608. The repackage stream process 608 captures the decluttered video stream 617 and merges the metadata 613 based on the configuration settings 616. The output of the repackage stream process 608 is the primary multimedia that is forwarded to the primary display 609.

Figure 7:
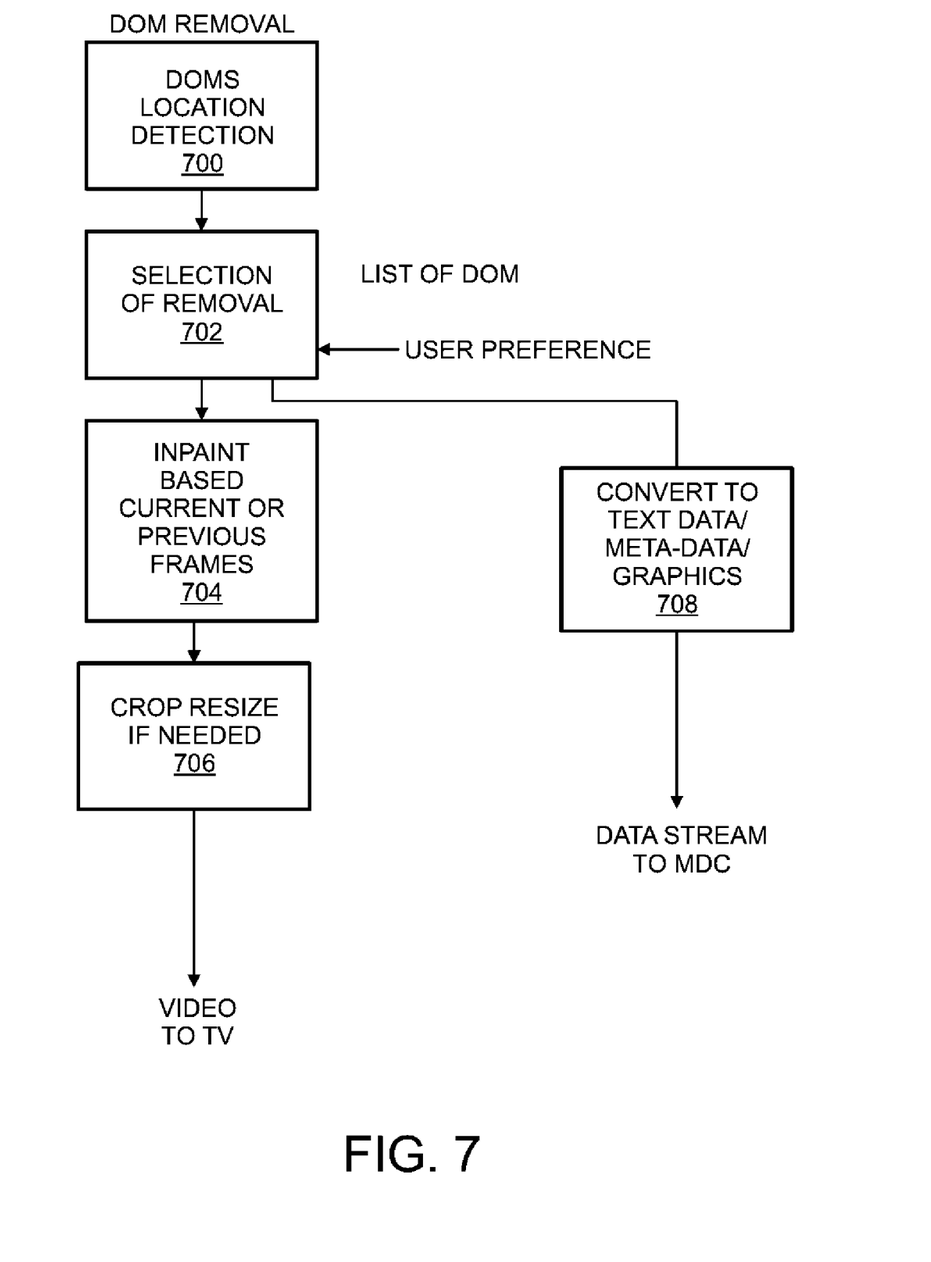
FIG. 7 illustrates a block diagram of an example logic flow for digital on-screen multimedia removal in accordance with embodiments of the present disclosure.

FIG. 7 illustrates a block diagram of an example logic flow for digital on-screen multimedia removal in accordance with embodiments of the present disclosure. Referring to FIG. 7, the locations of the DOMs are first evaluated 700 based on multimedia pattern recognition. Based on the configuration settings or user preference, the DOMs to be removed and to be converted to metadata are selected 702. A first output of 702, i.e., the locations to be removed, are inpainted 704 and cropped-and-resized 706 and forwarded to the primary multimedia outlet. In parallel, the second output of 702, i.e., the locations of the DOMs to be converted to metadata, are processed via OCR and voice recognition and converted into metadata 708. In some cases, the DOM contains an original content and additional overlay content or instructions to display the overlay. Removing said overlay content or instruction eliminates any need to inpaint or crop-resize. Hence, block 704 may be an instruction ignore command or a overlay removal command; which would have no reference to inpainting.

In accordance with embodiments, digital on-screen multimedia may be removed based on any suitable criteria. In examples, digital on-screen multimedia may be removed based on zone location, digital on-screen multimedia type, sound, digital on-screen multimedia content, a user, stream type, the like, and combinations thereof. For example, a ticker on a news network may be removed unless it is a weather alert. In another example, a digital on-screen graphic may be removed from the lower right ⅛ portion of a display screen. In another example, all sounds may be kept. In another example, scores for a predetermined team may be kept or removed. In another example, a bottom ticker may be cropped. In another example, a network logo may be removed. In another example, all digital on-screen graphics may be removed.

In another example, a flash or other notification may indicated when sound is removed. In another example, a predefined symbol may be displayed for particular users. In another example, a fantasy sports score of a team may be presented. In another example, a weather alert may be removed as long as it is redisplayed or posted on the second display.

In accordance with embodiments, a processor 102 shown in FIG. 1 may be implemented with suitable components for implementing the functionality described herein. For example, the processor 102 may include a communications bus for connecting various components. The connected components may include volatile or non-volatile memory, a communications unit, a display converter, FPGA, GPU, a CPU, a video encoder, a video decoder, or the like. The communications unit may be configured for Internet, wired, or wireless communication for example. The video encoder may transmit television signals. The video decoder may receive television signals.

In an example, removal and extraction of multimedia content may be included in local head ends prior to distribution in local such as hotel/resort/TV head end.

Example formats include GPP and WebVTT format.

The video signal may be generated from a variety of media sources and may include media distribution systems to provide broadcast or streaming analog or digital audio video signals such as Over The Air (OTA) broadcast systems, terrestrial cable systems (CATV), satellite broadcast systems. Another example of media source include any hardware or software element capable of storing and/or delivery media information such as a digital video recorder (DVR), a personal video recorder (PRV), a digital versatile disc (DVD) device, a video home system (VHS) device, a disk drive, a hard drive, a solid state drive, an optical disc drive, a universal serial bus flash drive, a memory card, a mass storage device, a flash drive, a gaming console, a digital camera, a gaming console, a video surveillance system, teleconferencing system, telephone system, medical and measuring instruction, television system, digital television system, set top boxes, personal video, server systems, computer systems, smart phones, tables, notebooks, hand-held computers, wearable computers, portable media players, portable media recorders, streaming internet services, multimedia cloud services, and the like The digital on-screen graphic may be semi-transparent or opaque.

Systems and methods disclosed herein may implement instructions that when executed enable a system to compare static image in multiple frames of the multimedia stream to a library of digital on-screen graphics; and determine that the static image matches a digital on-screen graphic from the library, determine a repeated image on the bottom half of multiple sequential frames of the multimedia stream, and determine that the repeated image is the on-screen graphic, determine the shape of the digital on-screen graphic, the shape comprising a union of one or a plurality of disconnected, adjacent or overlapping rectangles, circles, ellipses, or polygons. The DOG may be a scrolling ribbon that may occupy full bottom portion of the display screen. The DOG may include animation and may also be associated with audio cues.

In embodiments, the removal unit can convert the enhanced video into the video format with similar or additional vertical or horizontal resolution. The removal may include cropping a part of the top, bottom, left and/or right edge of the screen and resizing each frame. In another example, the detected location may be inpainted where the DOG occurred. The resizing process may include nearest neighbor padding, linear or quadratic interpolation The decision is made based on a set of metrics associated with the DOG shape such as width, length, surface, dimension, and the DOG location. The metrics are not limited to this list.

In accordance with embodiments, the television appendage may act in conjunction (in sync) with the primary screen to enhance viewing enjoyment and amusement. For example, in sports casting, a game is received by a television, and the television appendage is an add-on as an enhanced scoreboard device. In an example, the television appendage is an LCD screen about 5 inches wide and 3 to 5 feet long mounted above the television in close proximity such that the viewer can watch the game on the television, yet have a fuller more complete vision of all the statistics in-plane view for watching. This data is presented in real time, continuously, when it changes, randomly or periodically. This screen can also include audio porting in which in a continuous mode could replicate the exciting sounds of the stadium crowd, or buzz when a new ball player is substituted such as in a basketball game. In this configuration, the streamed data may come from a provider such as Netflix, ESPN, CNNSI, and the television appendage is plugged into the internet to receive such data after proper authentication, if necessary, has been performed. A second type of appendage may be more of a score board such as those intended for a gymnasium and made by Daktronics. Here, data is received via the Internet or some provider and sent to the processor for conditioning. The processor box then streams the data to the Daktronics score board for visualization. These boards could be analog or digital, but the processor box takes care of converting provided data from a provider into the proper standard for that device.

Other television appendages are also contemplated. For example, instead of a stationary mounted display, the sports data can be ported wirelessly to a hand held computer device such as a tablet or iPad type machine. For example, each user of a football league could obtain the same display of information such as the game statistics, team information league information or player information. Conversely, each user interface could be ported different information pertaining to the game, player, or league.

In other embodiments, the data stream may be received by the multimedia processor and consists of multiple sources. For instance, one source may be a television broadcast intended for the television, and the other may be an enhancement broadcast intended specifically for the viewing appendage. The streaming data is received by the multimedia processor where it is filtered and multiplexed to the proper display. The processor is configured to identify the first and second portions of the multimedia content and deliver a first portion to the first display, and a second portion to the second display. In this case, the first portion may be a sports event stripped of all overlays and translucent bothersome graphics exposing a full screen view, while the second portion may be the game changing scoreboard provided by the same broadcaster, or a second provider.

In other embodiments, the data stream is received by the multimedia processor and consists of at least one multimedia source. For example, the source may be a television broadcast intended for the television and appendage. The streaming data is received by the multimedia processor where it is filtered and multiplexed to the proper display. The processor is configured to identify the first and second portions of the multimedia content and deliver a first portion to the first display, and a second portion to the second display. In this case, the first portion may be a sports event stripped of all overlays and translucent bothersome graphics exposing a full screen view, while the second portion may post the overlays and graphics or even advertisements provided by the broadcaster. In this manner, the viewer is allowed a full screen display, while the provider can continue to provide information on the appendage such as the channel identifier, overlays, graphics, weather warnings, school closings, ticker tapes and the like. New dimensions to advertising can also take place on the appendage during a commercial break if the broadcaster desires. For example, while airing a commercial on the television, the appendage can support that commercial showing locations or even display coupon codes which may be location selected based on GPS or beacon type locations, RFID, Bluetooth and WiFi. Conversely, while showing a regular programming, the appendage programming could be marketed to support a more economical advertising campaign or less intrusive advertising program. This may incorporate the free version of the score board service, while a premium service would allow no advertisements or promotions of any kind on the appendage, while offering overlay free unobstructed viewing of the primary programming to the first display.

The multiprocessor operating on the data stream and multiplexing data to the TV and appendage can reside in a separate settop box, embedded in one of the primary television and appendage display, or reside in a mobile plug-in such as a USB port, Ethernet port, and the like. For example, the multiprocessor may be plugged directly into a port in one of the displays, and route information to the other displays. Software modifications to devices such as Apple TV and Google ChromeCast may be desirable which would then enable or modify these products to deliver content associated with at least one multimedia source, incorporating systems and methods for identifying and separately presenting different portions of streaming multimedia content to different displays.

The media processing device may execute processing operations or logic for the media processing system using a processing component. The processing component may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. They can also be also be dispatched to remote high performance computer systems such as on a cloud computer farm.

In accordance with embodiments, partial displays can be provided for multiple users concatenated into a full display with inclusion of the viewer information.

The television appendage architecture may be flexible and provide different configurations depending on the type of input and output multimedia streams.

In an example, the television appendage may retrieve information from the Internet and processes it based on viewer specific configurations to present to one or more external displays. A possible commercial application would be a set-top box or software product that can be configured to display stock pricing, real-time scores of the user favorite teams and fantasy football leagues to numerous displays. In this embodiment, only the CAC, AEC and MCC elements are active. The software product can reside in the appendage display or externally in a set top box configuration. The smart TV could eliminate the need for a set top box. This configuration can be viewed as a simple scoreboard, and the OEC is neither activated nor implemented.

In another example of the television appendage, similar to the previous example, the system includes a display that is mechanically integrated. As previously, the television appendage retrieves information from the Internet and processes it based on viewer specific configurations to present to the integrated display and transmits to one or more external displays.

In another example, the television appendage may retrieve information from the Internet and from a multimedia stream and processes them based on viewer specific configurations to present to external displays and the external television. In this embodiment, the CAC, AEC, OEC and MCC elements are available. It is possible to configure the OEC to only extract the metadata from the multimedia stream, hence, letting pass through the video stream with overlays. An embodiment of this configuration is a dongle similar to Google CHROMECAST® to be plugged to a television set or personal computer, with the secondary displays being external and wireless.

In another example, the television appendage similar to the configuration above but includes the display. In this configuration, the television appendage is mechanically integrated with a display. This can be implemented as a set-top box with display and speakers.

In another example, the television appendage may be mechanically integrated with the television and second display.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

The invention claimed is:

1. A system comprising:
a primary user interface comprising a first display device;
a secondary user interface comprising a second display device separate from and within viewer proximity to the first display device; and
a multimedia content processor in communication with the first display device and second display device, the multimedia content processor configured to:
receive multimedia content generated by a content provider for display as a video on a single display device;
identify a primary video portion of the received multimedia content and a removable video portion of the received multimedia content;
separate the removable video portion of the received multimedia content from the primary video portion of the received multimedia content;
extract metadata from the removable video portion of the received multimedia content;
retrieve external data according to at least one of the extracted metadata, the content provider, and an external source;
prepare for presentation a secondary video comprising:
at least one of a portion of the removable video portion of the received multimedia content, a portion of the retrieved external data, and content according to the retrieved external data;
control the first display device to display the primary video portion of the received multimedia content; and
control the second display device to display said secondary video comprising at least one of a portion of the removable video portion of the received multimedia content, a portion of the retrieved external data, and content according to the retrieved external data,
wherein the multimedia content processor is further configured to identify the removable video portion by comparing a static image in multiple frames of the multimedia stream to a library of digital on-screen graphics and determining that the static image matches a digital on-screen graphic from the library,
wherein the multimedia content processor is further configured to separate the removable video portion of the received multimedia content from the primary video portion of the received multimedia content by cropping a part of the top, bottom, left and/or right edge of the screen and resizing each frame of the primary video portion,
wherein the multimedia content processor is further configured to inpaint a region of the primary video portion that was occluded by the removable portion prior to separating the removable video portion from the primary video portion.

2. The system of claim 1 wherein the second display device presents real time sports multimedia received from an external entity, and the first display device presents video related to the second display.

3. The system of claim 1, further comprising a multimedia source configured to stream the multimedia content to the multimedia processor.

4. The system of claim 1, wherein the multimedia content comprises at least one of video content, image content, and audio content.

5. The system of claim 1, wherein before the removable video portion is separated from the primary video portion, the primary video portion comprises information for full-screen display, and wherein the removable video portion comprises information for partial-screen display over the primary video portion.

6. The system of claim 4, wherein:
a first output component outputs the primary video portion to a first client; and
a second output component outputs the secondary video to a second client.

7. The system of claim 1, wherein the second user interface is configured to display the secondary video in a full-screen mode.

8. The system of claim 1, wherein the primary video portion comprises video of a sporting event, and wherein the removable video portion comprises secondary metadata associated with the sporting event.

9. The system of claim 8, wherein the removable video portion further comprises real time or live audio associated with the sporting event.

10. The system of claim 1, wherein the primary video portion and the removable video portion are associated with digital rights management.

11. The system of claim 10, wherein the digital rights management is subject to permission for unlocking.

12. A computing device comprising:
a primary movable device;
a secondary movable device separate from and within viewer proximity to the primary movable device; and
a processor module that:
receives identification information of the primary movable device and the secondary movable device;
receives, from one of a processor module and the secondary movable device, an instruction to monitor a position of the primary movable device;
in response to receiving the instruction:
determines a position of the primary movable device;
determines that the primary movable device is clear of unwanted content;
determines whether the position of the primary movable device is one of: at a predetermined location; and a predetermined distance from the secondary movable device; and
identifies, from multimedia content generated by a content provider for display as a video on a single display device, a primary video portion and a removable video portion of the multimedia content;
separates the removable video portion from the primary video portion of the multimedia content;
extracts metadata from the removable video portion of the multimedia content;
retrieves external data according to at least one of the extracted metadata, the content provider, and an external source;
prepares for presentation a secondary video comprising:
at least one of a portion of the removable video portion of the multimedia content, a portion of the retrieved external data, and content according to the retrieved external data; and
controls communication of the primary video portion of the multimedia content with the secondary movable device based on the determination that the position of the primary movable device is one of a predetermined location and a predetermined distance from the secondary movable device, wherein the primary video portion of the multimedia content and said secondary video comprising at least one of a portion of the removable video portion of the multimedia content, a portion of the retrieved external data, and content according to the retrieved external data are displayed, respectively, on the primary movable device and second movable device in synchronization,
wherein the multimedia content processor is further configured to identify the removable video portion by comparing a static image in multiple frames of the multimedia stream to a library of digital on-screen graphics and determining that the static image matches a digital on-screen graphic from the library,
wherein the multimedia content processor is further configured to separate the removable video portion of the received multimedia content from the primary video portion of the received multimedia content by cropping a part of the top, bottom, left and/or right edge of the screen and resizing each frame of the primary video portion,
wherein the multimedia content processor is further configured to inpaint a region of the primary video portion that was occluded by the removable portion prior to separating the removable video portion from the primary video portion.

* * * * *